United States Patent
Ceccaldi et al.

(10) Patent No.: US 10,832,392 B2
(45) Date of Patent: Nov. 10, 2020

(54) METHOD, LEARNING APPARATUS, AND MEDICAL IMAGING APPARATUS FOR REGISTRATION OF IMAGES

(71) Applicant: Siemens Healthcare GmbH, Erlangen (DE)

(72) Inventors: Pascal Ceccaldi, Princeton, NJ (US); Tanja Kurzendorfer, Trautmannshofen (DE); Tommaso Mansi, Plainsboro, NJ (US); Peter Mountney, London (GB); Sebastien Piat, London (GB); Daniel Toth, Twickenham (GB)

(73) Assignee: Siemens Healthcare GmbH, Erlangen (DE)

( * ) Notice: Subject to any disclaimer, the term of this patent is extended or adjusted under 35 U.S.C. 154(b) by 123 days.

(21) Appl. No.: 16/225,774

(22) Filed: Dec. 19, 2018

(65) Prior Publication Data

US 2020/0202507 A1    Jun. 25, 2020

(51) Int. Cl.
*A61B 34/37* (2016.01)
*G06T 7/00* (2017.01)
(Continued)

(52) U.S. Cl.
CPC ......... *G06T 7/0002* (2013.01); *G06N 3/0454* (2013.01); *G06N 3/08* (2013.01);
(Continued)

(58) Field of Classification Search
None
See application file for complete search history.

(56) References Cited

U.S. PATENT DOCUMENTS

| 7,880,717 B2 * | 2/2011 | Berkley | G06F 3/016 345/156 |
| 8,332,072 B1 * | 12/2012 | Schaible | B25J 9/1633 700/257 |

(Continued)

OTHER PUBLICATIONS

Heimann et al—Learning without Labeling: Domain Adaptation for Ultrasound Transducer Localization Siemens AG publication (2012) (Year: 2012).*

(Continued)

*Primary Examiner* — Iman K Kholdebarin
(74) *Attorney, Agent, or Firm* — Schiff Hardin LLP

(57) ABSTRACT

A method of training a computer system for use in determining a transformation between coordinate frames of image data representing an imaged subject. The method trains a learning agent according to a machine learning algorithm, to determine a transformation between respective coordinate frames of a number of different views of an anatomical structure simulated using a 3D model. The views are images containing labels. The learning agent includes a domain classifier comprising a feature map generated by the learning agent during the training operation. The classifier is configured to generate a classification output indicating whether image data is synthesized or real images data. Training includes using unlabeled real image data to training the computer system to determine a transformation between a coordinate frame of a synthesized view of the imaged structure and a view of the structure within a real image. This is done whilst deliberately reducing the ability of the domain classifier to discriminate between a synthesized image and a real image of the structure.

19 Claims, 6 Drawing Sheets

(51) Int. Cl.
G06T 11/00 (2006.01)
G06N 3/08 (2006.01)
G06N 20/20 (2019.01)
G06N 3/04 (2006.01)

(52) U.S. Cl.
CPC ............ *G06N 20/20* (2019.01); *G06T 11/003* (2013.01); *G06T 2207/20081* (2013.01); *G06T 2207/20084* (2013.01); *G06T 2210/41* (2013.01)

(56) References Cited

U.S. PATENT DOCUMENTS

| | | | | |
|---|---|---|---|---|
| 8,416,203 | B2* | 4/2013 | Tsui | H04M 1/67 |
| | | | | 345/173 |
| 8,463,006 | B2* | 6/2013 | Prokoski | A61B 5/7264 |
| | | | | 382/128 |
| 8,884,618 | B2* | 11/2014 | Mahfouz | A61F 2/3601 |
| | | | | 324/309 |
| 8,926,511 | B2* | 1/2015 | Bar-Tal | A61B 5/06 |
| | | | | 600/443 |
| 9,888,973 | B2* | 2/2018 | Olson | A61B 34/71 |
| 10,058,395 | B2* | 8/2018 | Devengenzo | A61B 34/37 |
| 10,416,264 | B2* | 9/2019 | Sofka | G01R 33/4806 |
| 2011/0128555 | A1* | 6/2011 | Rotschild | G02B 30/50 |
| | | | | 356/625 |
| 2011/0152882 | A1* | 6/2011 | Wenderow | A61B 34/25 |
| | | | | 606/130 |
| 2011/0306986 | A1* | 12/2011 | Lee | B25J 9/1689 |
| | | | | 606/130 |
| 2012/0133601 | A1* | 5/2012 | Marshall | G16H 30/20 |
| | | | | 345/173 |
| 2013/0006268 | A1* | 1/2013 | Swarup | A61B 34/37 |
| | | | | 606/130 |
| 2013/0154913 | A1* | 6/2013 | Genc | G06F 3/013 |
| | | | | 345/156 |
| 2013/0179162 | A1* | 7/2013 | Merschon | G06F 3/017 |
| | | | | 704/231 |

OTHER PUBLICATIONS

Tothi et al "3D/2Dmodel-to-image registration by imitation learning for cardiac procedures," mnt. J. of Computer Assisted Radiology and Surgery, vol. 13, pp. 1I14 I-I149 (2018) (Year: 2018).*

Heimann, et al. "Real-time ultrasound transducer localization in fluoroscopy images by transfer learning from synthetic training data" Medical Image Analysis, vol. 18, No. 8, pp. 1320-1328, (2014).

Heimann et al—Learning without Labeling: Domain Adaptation for Ultrasound Transducer Localization Siemens AG publication (2012).

Lafarge et al "Domain-adversarial neural networks to address the appearance variability of histopathology images" Eindhoven University publication (2017).

Toth et al "3D/2Dmodel-to-image registration by imitation learning for cardiac procedures," Int. J. of Computer Assisted Radiology and Surgery, vol. 13, pp. 1141-1149 (2018).

Ganin, et al. "Domain-adversarial training of neural networks." The Journal of Machine Learning Research 17.1 pp. 2096-2030 (2016).

* cited by examiner

METHOD, LEARNING APPARATUS, AND MEDICAL IMAGING APPARATUS FOR REGISTRATION OF IMAGES

BACKGROUND OF THE INVENTION

Field of the Invention

The present invention concerns a method for determining a correspondence transformation between coordinate frames of sets of image data. In further aspects, the present invention concerns a medical imaging apparatus and a non-transitory, computer-readable data storage medium that implements such a method. In particular the invention is concerned with a method of training a computer system, according to a machine learning algorithm, for determining a correspondence transformation between coordinate frames of sets of image data.

Description of the Prior Art

For medical applications that involve preoperative planning and intraoperative guidance, there is often benefit in being able to determine a transformation between a coordinate frame of an image acquired preoperatively and a coordinate frame of an image take intraoperatively. Such a determination of a transformation is often referred to as registration.

The registration between images acquired using different imaging modes/apparatus is challenging because structures observable in an image acquired using one imaging mode/apparatus of imaging may appear to be different (or not visible at all) in an image acquired using a different imaging mode/apparatus. Image contrast levels, resolution and intensity values, as well as a field of view, may be significantly different as between different imaging modes/apparatus. As an example, soft tissue structures that are observable in a magnetic resonance image may not be visible (or not easily observable) in an X-ray fluoroscopy image. Finding a transformation between two image datasets that were acquired using fundamentally different imaging modes/apparatus can therefore be challenging.

An example of an application which uses both preoperative and intraoperative images is a minimally invasive cardiac intervention, such as cardiac resynchronization therapy. In this procedure, differences between preoperative and intraoperative image data can be significant. Typically, the preoperative data is acquired using magnetic resonance imaging technique and the intraoperative data is acquired using a two-dimensional X-ray fluoroscopy technique. The preoperative magnetic resonance acquisition may comprise a stack of images each showing the soft tissue anatomy with high in-plane resolution but low out-of-plane resolution.

Each of the stacks of magnetic resonance images may have a relatively small field of view in order to concentrate on the anatomy of interest (for example, the ventricles of the heart), showing only a few surrounding structures. Accordingly, structures that may otherwise be useful for registration (such as the spine or the ribs) may not be visible in the magnetic resonance data. In contrast, X-ray fluoroscopy performed intraoperatively may have a wider field of view and show dense structure, such as bones or instruments, but may not show the soft tissue anatomy clearly.

Typically, registration of preoperative magnetic resonance images to intraoperative X-ray for cardiac resynchronization therapy, for example, is performed manually. In order to address the problem that there are few structures common to images acquired using each modality (i.e. that cross-modality information is highly limited), fiducial markers may be used. However, use of fiducial markers for registration requires the preoperative imaging to be performed immediately before the procedure (and the corresponding intraoperative imaging), to ensure that the fiducial markers are consistent between imaging modalities. This may require a change in clinical procedures and may also require additional imaging hardware in the operating room.

Artificial intelligence based approaches have been used to perform registration between different sets of image data acquired using different imaging modalities. However, there are a number of challenges in achieving accurate and robust registration between imaging modalities. Large sets of training data with ground truth information is needed in order to train a system to accurately and robustly perform registration. Such data is difficult to obtain for certain combinations of imaging modalities. Obtaining such data sets is a challenge.

Hence an artificial intelligence, or learning machine, trainable to perform image registrations in these circumstances, with less reliance on large training data containing ground truth information, is highly desirable.

A "learning machine" (or intelligent agent) may be e.g. computer in which a program is changed according to experience gained by the machine itself during a complete run.

SUMMARY OF THE INVENTION

The method according to the invention for training a computer system, for use in determining a transformation between coordinate frames of image data representing an imaged subject, has the following steps.

The computer system receives first source image data representing a synthesized structure presented in a number of different views synthesized according to a model of the structure.

The computer system receives second source image data representing a synthesized structure presented in a number of different views synthesized according to a model of the structure.

The computer system receives third source image data representing a view of an imaged structure generated by an imaging apparatus in capturing an image of the subject.

In a first training operation, the computer system, configured as a learning agent according to a machine learning algorithm, is trained so as to determine a transformation between respective coordinate frames of at least two of the number of different views of the synthesized structure, using the first source image data and labels associated therewith;

In accordance with the invention, the learning agent includes a domain classifier having a feature map generated by the learning agent during the first training operation and configured to generate therefrom a classification output indicating that received image data is one of the third source image data (a first domain) or the second source image data (a second domain).

A second training operation is executed using the second and third source image data without using labels associated therewith, in which the computer system is trained to determine a transformation between respective coordinate frames of the view of the imaged structure and the view of the synthesized structure, such that the ability of the domain classifier to discriminate between the synthesized structure and the imaged structure is reduced.

The first source image data may be labeled data. The second source image data may be unlabeled image data. The third source image data may be unlabeled data.

The term "labeled data" refers to a sample or a group of samples of data, such as images or image data that have been tagged with one or more labels relevant to the learning task at hand. As an example, a labeled image might contain or include, or have associated with it, a tag indicating what anatomical structure or structures, are shown within the image. Labels may be obtained by asking humans to make judgements about a given piece of unlabeled data. Labels may be obtained by providing a labeled dataset (e.g. labeled by humans) and applying to that dataset a machine learning model arranged to learn how to appropriately label image data, whereby un-labeled image data may subsequently be applied to the trained machine learning model and a likely label can be estimated for that image by the trained model. The term "un-labeled" refers to data (e.g. images) that do not bear a tag relevant to the learning task at hand (or no tag at all). These labeling definitions and techniques are in accordance with established practice in the art and are readily available to those of ordinary skill in the art.

An illustrative example is as follows: labels may represent the rewards for each possible action. These may be computed from a perturbation that is applied to the 3D model before projecting it into a 2D image. For example, the labels belonging to the first source image data described in an embodiment below, (e.g. see: "Synthesized Image #1 and #2" of FIG. 1), represent the rewards for each possible action. Alternatively, or in addition, the labels may directly represent the actions. Any two images of the first source image data, and the labels (rewards and/or actions) associated with them, may form a triplet that is used for training. The rewards are higher the better the action is (i.e. the better it is at moving closer to target).

In this way, the invention provides a method of training a learning agent to identify suitable transformations between different synthesized views of a model of a structure, such as an anatomical structure (e.g. an organ, muscle, bones, vasculature etc.) of a human body. These synthesized views are labeled image data. It is very easy to rapidly produce and correctly label large quantities of images of the labeled structure in many different views. This labeled, synthesized image data are used to train the learning agent in the first training operation, so that the learning agent is increasingly able to identify transformations between labeled, synthesized image data. Importantly, in the process of this first training operation, the feature map (or maps) of the learning agent is (are) trained appropriately to identify the relevant image features useful for determining transformations.

This feature map data is then used in the feature map, or maps, of the layer, or layers, of the domain classifier one training the learning agent according to the second training operation which trains using un-labeled image data.

During the second training operation the learning agent is trained in such a way that the agent is deemed more optimal when the domain classifier comes less able to discriminate between the synthesized second source data and the "real" third source data. The aim and goal of this is to train the learning agent to employ domain-agnostic features of the second and third image data for the purposes of determining the transformation between corn frames of image data. This means that the image features from within images that are employed for that purpose, will be less likely to contain synthetic artefacts of the model used to synthesize the second image data, and will be more likely to be an anatomical feature common to both the synthetic second images and the "real" third images. This means that fully labeled synthetic image data (the first image data) can be used to train the learning agent without the need to use "real" training images that have been pre-labeled manually.

The domain classifier may be configured to generate from said feature map a probability estimate that received image data is one of the third source image data (a first domain) or the second source image data (a second domain). Preferably, the second training operation includes training the computer system to determine the transformation between respective coordinate frames of the view of the imaged structure and the view of the synthesized structure, such that the probability estimate approaches a value of 0.5 thereby reducing the ability of the domain classifier to discriminate between the synthesized structure and the imaged structure.

In this way, the domain classifier may be arranged to generate a probability value to express a likelihood that image data input to the domain classifier is from one of the first domain and the second domain. As the discriminator becomes less able to make such discrimination, as a result of the second training operation, then the likelihood measure (e.g. probability value) will become more equivocal. In numerical terms, the probability value becomes more equivocal when its value becomes closer to 0.5. That is to say, when the probability that the image data belongs to the first domain, is equal to the probability that it belongs to the second domain, the discriminator becomes wholly unable to discriminate between the two domains.

In other machine learning algorithms, the numerical expression of a likelihood of classification to a given domain, may be in terms of a "distance" metric such as would be readily apparent to the skilled person.

The machine learning algorithm may comprise one or more neural networks. The machine learning algorithm may comprise an adversarial neural network such as a domain-adversarial neural network (DANN).The machine learning algorithm may comprise an adversarial neural network, such as a generative adversarial neural network (GAN). The GAN is arranged to perform the discrimination step (the second training operation) to counteract the goal of the first training operation (the generative step), while trying to differentiate between the first domain and the second domain. The GAN may comprise a Wasserstein GAN (WGAN) whereby classification does not take place based upon a probability value/answer, but instead takes place by measuring a distance metric (a Wasserstein Distance) representing a difference (the size of the distance metric) between probability distributions of the first domain and the second domain.

The machine learning algorithm may comprise a first neural network arranged for receiving input image data, and generating a first network output therefrom, a second neural network arranged for receiving input image data, and generating a second network output therefrom, a third neural network arranged for receiving as input both the first network output and the second network output, and generating a third network output therefrom for determining the transformation, and a fourth neural network defining the domain classifier and arranged for receiving as input one or more of the activations generated by a layer of the first neural network and/or the second neural network.

The fourth neural network may define aforementioned domain classifier. It may define a domain adversarial neural network (DANN). The fourth neural network may be arranged to receive as its input, or inputs, one or more (e.g. all) of the activations generated by one (e.g. only one, alone) layer of the first neural network, or by a plurality of layers of the first neural network, without receiving any activations from the second network. Alternatively, the fourth neural network may be arranged to receive as its inputs, activations generated by one layer (e.g. only one, alone), or multiple layers, of the first neural network and the second neural network simultaneously. The fourth neural network may comprise one, or more than one, layers.

Each of the layers of the fourth neural network may receive as their input, activations generated by a layer of either one of the first neural network and the second neural network. The machine learning algorithm may comprise two said classifier, one classifier being arranged to receive activations from the first neural network, and another classifier being arranged to receive activations from the second neural network. One classifier may be arranged to adapt the first neural network with respect to domains associated with the labeled data (e.g. first image source data), and the other classifier may be arranged to adapt the second neural network with respect to domains associated with the un-labeled data (e.g. second and/or third image source data).

The fourth neural network may define a first said domain classifier and may be arranged for receiving as input one or more of the activations generated by a layer of the first neural network, and the machine learning algorithm may comprise a fifth neural network defining a second said domain classifier and arranged for receiving as input one or more of the activations generated by a layer of the second neural network. As the fourth neural network (e.g. a DANN) is applied to adapting the first neural network from a first domain to a second domain, the fifth neural network (e.g. a DANN) may be applied to adapting the second neural network. Thus the existence of a fifth network, being a second discriminator, is possible if one would want to adapt both the first and the second neural networks.

The classifier may be arranged to adapt the second neural network in respect of the second and/or third source image data.

The first, second and fourth neural networks may each comprise a respective convolutional neutral network (CNN). The third neural network may comprise a fully-connected neural network (FC).

The machine learning algorithm may comprise a domain-adversarial neural network.

The second training operation may comprise training the computer system such that the probability estimate achieves a value of between 0.6 and 0.4, such as between 0.45 and 0.55, or closer still to a target value of 0.5. Of course, where a distance metric is employed (e.g. a Wasserstein Distance) as a classification output, instead of a probability value, then an appropriate target value for that distance may be selected as the target value to which the computed distance should preferably approximate.

The model may be a three-dimensional model comprising three-dimensional image data, and the first target image data may comprise two-dimensional image data representing a two-dimensional projection of the three-dimensional model to define a said view.

The model may be a three-dimensional model comprising three-dimensional image data, and the first training operation can include generating projection image data based on a two-dimensional projection of the model, receiving, at the computer system, the projection image data as the first source image data, determining, by the computer system, a reward for each of a plurality of actions applicable to the projection image data, selecting an action based on the determined rewards, and transforming the projection image data according to the selected action.

In this way, the first training operation may select a transformation which has the optimal reward.

The step of transforming the projection image data may comprise applying the selected action to the model to generate a transformed model, and generating further projection image data based on a two-dimensional projection of the transformed model. Accordingly, the selected action may comprise a linear transformation and/or a rotation, and/or any other suitable sort of spatial transformation defined by the selected action for implementing the transformation. The action is preferably applied to the model (e.g. a 3D model of an anatomical object) and the 2D projection rendered from that, but a transformation or action may be applied to an existing 2D projection, if desired.

The reward for each of the multiple actions may be determined based on a translation and/or a rotation of the projection image data, or any other type of spatial transformation.

The model may be a three-dimensional model comprising three-dimensional image data, and the second training operation may include generating projection image data based on a two-dimensional projection of the model, receiving, at the computer system, the projection image data as the second source image data, determining, by the computer system, a reward for each of a plurality of actions applicable to the projection image data, selecting an action based on the determined rewards, and transforming the projection image data according to the selected action.

The step of transforming the projection image data in the second training operation may comprise applying the selected action to the model to generate a transformed model, and generating further projection image data based on a two-dimensional projection of the transformed model. The reward for each of the plurality of actions may be determined based on a translation and/or a rotation of the projection image data. More particularly, the transformation could be anything, not just rotation or translation. Rotation or translation are suitable for a rigid registration, as appropriate, however in affine registration, for example, the transformation could be shearing/scaling, or it could be any transformation in non-rigid registration. The reward, in either of the first and second training operations, may be any suitable reward metric or measure as would be readily apparent to a person of ordinary skill in the art. Examples include a value representing a cost function or a loss function. The selection of the action may be such that the action associated with the lowest cost/loss function value (or the highest value, in some cases such as domain adversarial networks), from amongst those cost/loss function values that have been determined, is selected. The process of action selection may preferably be an iterative process where actions with successively/better/rewards are successively sought and selected in order to approach an optimal action providing the best reward (e.g. lowest loss/cost).

The third source image data may be any one of magnetic resonance image data, computed tomography image data, and ultrasound image data, and X-ray image data.

Accordingly, the invention also encompasses a method of determining a transformation between coordinate frames of image data representing an imaged subject, wherein a trained computer system, trained as described above, is provided.

The method further includes receiving synthesized image data representing a view of a structure synthesized according to a model of the structure, receiving captured image data representing an imaged structure generated by capturing an image of the subject, and determining a transformation between the coordinate frames of the synthesized image data and the captured image data using the trained computer system.

The synthesized image data may be unlabeled data. The captured image data may be unlabeled data.

The invention also encompasses a learning machine that includes a trained computer system which is trained as described above.

The invention also encompasses a non-transitory, computer-readable data storage medium encoded with programming instructions that, when the storage medium is loaded into a computer system to be trained, cause the computer system to implement any or all embodiments of the method according to the invention, as described above.

The invention also encompass a medical imaging device having a processor and a medical data acquisition scanner.

The processor receives first source image data representing a synthesized structure presented in a number of different views synthesized according to a model of the structure, and receives second source image data representing a synthesized structure presented in a number of different views synthesized according to a model of the structure.

The processor receives third source image data representing a view of an imaged structure, generated by capturing an image of the subject by operation of the scanner.

The processor is configured to perform a first training operation, as a learning agent according to a machine learning algorithm, to determine a transformation between respective coordinate frames of at least two of the number of different views of the synthesized structure, using the first source image data and labels associated therewith.

The learning agent includes a domain classifier having a feature map generated by the learning agent during the first training operation and configured to generate therefrom a probability estimate that received image data is one of the third source image data (a first domain) or the second source image data (a second domain).

The processor is configured to perform a second training operation using the second and third source image data without using labels associated therewith, as a learning agent according to a machine learning algorithm, to determine a transformation between respective coordinate frames of the view of the imaged structure and the view of the synthesized structure, such that the ability of the domain classifier to discriminate between the synthesized structure and the imaged structure is reduced. The first source data may be labeled data. The second source data may be unlabeled data. The third source image data may be unlabeled data.

The processor may be arranged to receive synthesized image data representing a view of a structure synthesized according to a model of the structure, and receive captured image data representing an imaged structure generated by capturing an image of the subject, and determine a transformation between the coordinate frames of the synthesized image data and the captured image data. The synthesized image data may be unlabeled data. The captured image data may be unlabeled data.

DESCRIPTION OF THE PREFERRED EMBODIMENTS

Figure 3:
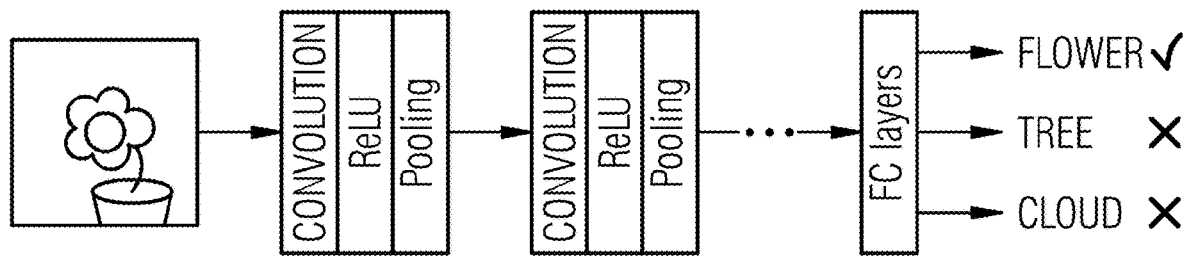
FIG. 3 shows a schematic diagram of a convolutional neural network (CNN) relevant to embodiments of the invention.

FIG. 3 schematically illustrates a convolutional neural network (CNN) as a machine learning algorithm used for deep learning. This CNN is specifically arranged for image data as input. CNNs differ from other types of neural networks in that the neurons in a network layer of a CNN are connected to sub-regions of the network layers before that layer instead of being fully-connected as in other types of neural network. The neurons in question are unresponsive to the areas outside of these sub-regions in the image.

These sub-regions might overlap, hence the neurons of a CNN produce spatially-correlated outcomes, whereas in other types of neural networks, the neurons do not share any connections and produce independent outcomes. In a neural network with fully-connected neurons, the number of parameters (weights) may increase quickly as the size of the input image increases.

A convolutional neural network reduces the number of parameters by reducing the number of connections, by sharing weights, and by down-sampling. A CNN may typically consist of multiple layers, such as convolutional layers, rectified linear units/layers (ReLU), pooling layers, and fully-connected (FC) layers. These are schematically illustrated in FIG. 3.

Figure 4:
FIG. 4 shows a schematic diagram of a sequence of operation of neighboring layers of a convolutional neural network (CNN) relevant to embodiments of the invention.
Figure 4:
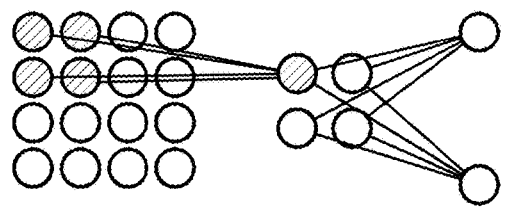
Figure 4:
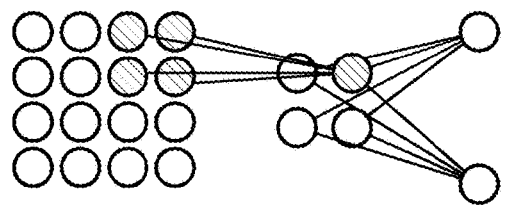
Figure 4:
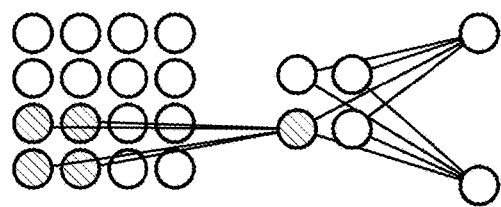
Figure 4:
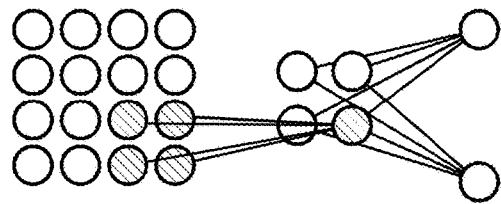

The neurons (not shown) in each layer of a CNN are arranged in a 3-D manner, transforming a 3-D input to a 3-D output. For example, for an image input, the first layer (input layer) holds the images as 3-D inputs, with the dimensions being image height, image width, and the color channels of the image. The neurons in the first convolutional layer connect to the regions of these images and transform them into a 3-D output. The hidden units (neurons) in each layer learn nonlinear combinations of the original inputs. This learning process is known as "feature extraction". These learned features, also known as activations, from one layer become the inputs for the next layer. This is schematically illustrated in FIG. 4 and in more detail in FIG. 6, which is described below. Finally, the learned features become the inputs to a classifier or a regression function at the end of the network.

Referring to FIG. 4, groups of inputs corresponding to a common area of an input image, are combined and input to one common neuron of a hidden layer of the CNN. The hidden layer has as many neurons as there are separate areas of the input image for this purpose. The neurons of the convolutional hidden layer may then be fully connected to an FC layer which generates an output accordingly.

Figure 5:
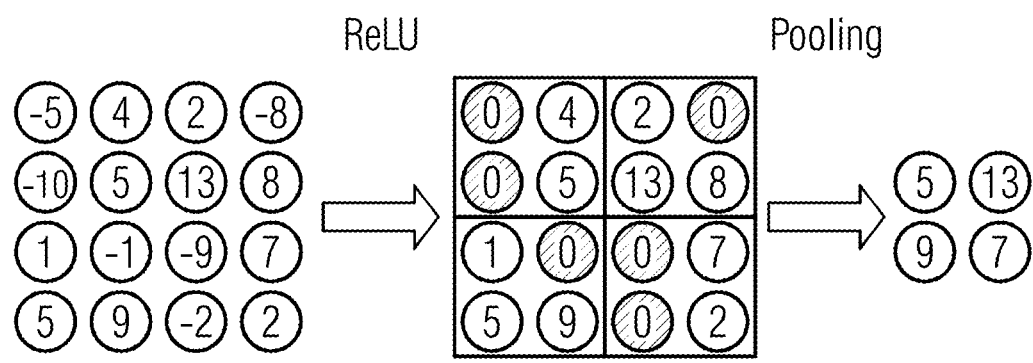
FIG. 5 shows a schematic diagram of a process implemented by a rectified linear unit and a process implemented by a pooling operation, in a convolutional neural network (CNN) relevant to embodiments of the invention and useful for understanding.

FIG. 5 schematically illustrates the process implemented by rectified linear units/layers (ReLU), and pooling layers, in a CNN. The ReLU process takes as its input the activations from a convolutional layer of the CNN, and changes (rectifies) those inputs by changing any negative-values input/activation value to zero. All positive-valued inputs/activations are left unchanged. The pooling process takes as its input the activations from a convolutional layer of the CNN, typically after a ReLU process has been applied to them as shown in FIG. 5, and down-samples those inputs/activations as follows. To achieve down-sampling, the full area of the layer of input activations in question is divided into sub-areas of equal size and the highest-valued activation from within each sub-area is selected for output.

The selected activation is assigned the same relative position in the pooled output layer, relative to the positions of the other selected activations, as the relative position occupied by the sub-area it is associated with.

Figure 6:
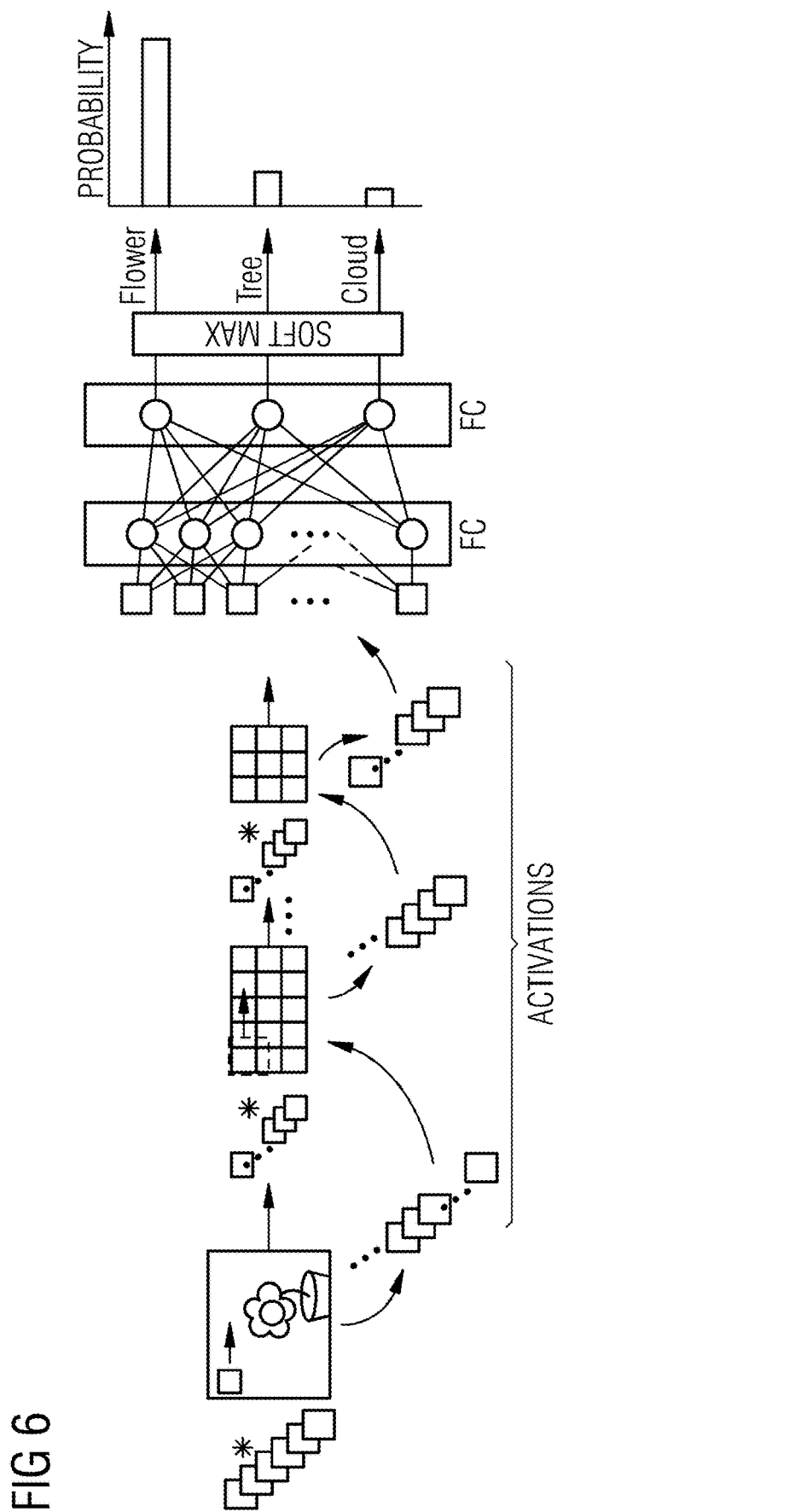
FIG. 6 shows a schematic diagram of a convolutional neural network (CNN) relevant to embodiments of the invention.

FIG. 6 schematically illustrates the process of generating activations for each convolutional layer of a CNN, using a series of filters adapted to identify different features (levels of abstraction) within an input image. Each filter of a first series of filters is convolved (symbol "*") with the input image. These first filters may be arranged to identify e.g. shapes, but less so detail. This produces a first set of activations which are input to the first hidden layer of the CNN. Each filter of a second series of filters is convolved (symbol "*") with the activations of the first hidden layer. These second filters may be arranged to identify e.g. more detail. This produces a second set of activations which are input to the second hidden layer of the CNN. Each filter of a third series of filters is convolved (symbol "*") with the activations of the second hidden layer. These third filters may be arranged to identify e.g. even more detail. This produces a third set of activations which are input to the third hidden layer of the CNN. The process continues through as many successive hidden layers as desired until the activations generated by a final hidden layer are input to a fully-connected (FC) neural network which is trained to process the input activations to produce a final output such as a classification probability with which to classify the input image according to pre-defined classifications.

Figure 1:
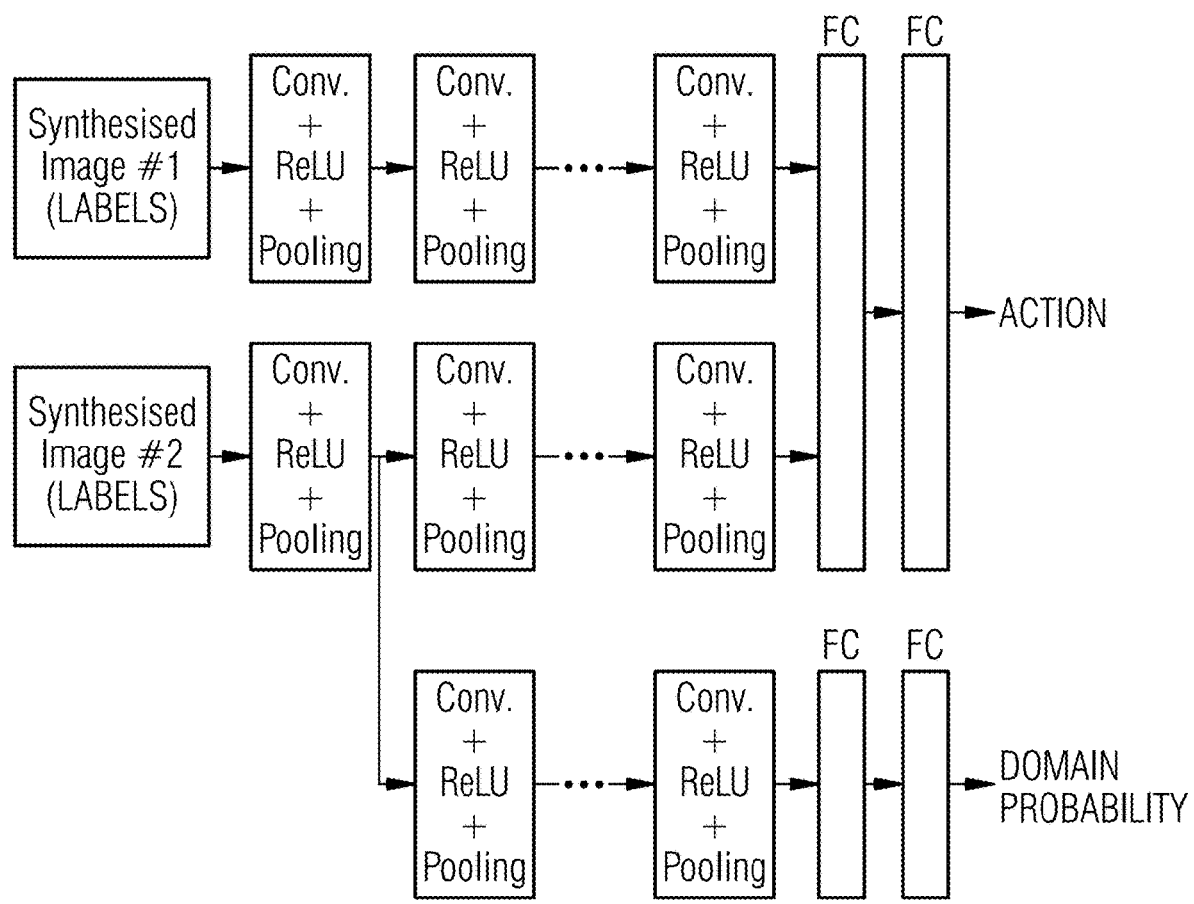
FIG. 1 shows a schematic diagram of a neural network according to an embodiment of the invention, subject to a first training operation.

Referring to FIG. 1 there is schematically shown a domain-adversarial neural network (DANN) configured in a computer system, according to an embodiment of the invention, for use in determining a transformation between coordinate frames of image data representing an imaged subject.

The DANN comprises a first CNN neural network arranged for receiving first synthesized and labeled input image data (image #1), and for generating a first network output therefrom. The DANN comprises a second CNN arranged for receiving second synthesized and labeled input image data (image #2), and for generating a second network output therefrom. The first and second CNN outputs are each input to a common fully-connected (FC) neural network. The FC neural network is arranged to generate a third network output from these inputs, for determining a coordinate transformation between image #1 and image #2.

A fourth neural network, defining the domain classifier, is arranged for receiving as an input to its first hidden layer, the activations generated by the first layer of the second neural network.

The addition of the fourth neural network ensures that the machine learning algorithm is configured as a domain-adversarial neural network.

The computer system is arranged to receive first image data (image #1) representing a synthesized structure presented in a first of a plurality of different views synthesized according to a model of the structure. This data is labeled data. Simultaneously, the computer system is arranged to receive second image data (image #2) representing a second view of the plurality of different views (different to the first view). This data is also labeled data. The labels applied to "Synthesized Image #1 and #2" of FIG. 1 represent the rewards for each possible action. These are computed from a perturbation that is applied to the 3D model before projecting it into a 2D image. Any two images of the first source image data, and the labels (rewards and/or actions) associated with them, may form a triplet that is used for training. The rewards are higher the better the action is (i.e. the better it is at moving closer to target).

The computer system is arranged to implement a first training operation for training the computer system to determine a transformation between the respective coordinate frames of image #1 and image #2 of the plurality of different views of the synthesized structure. This is done using the labeled image data. Because the fourth CNN is able to receive the activations of the first hidden layer of the second CNN, during this training process, it becomes "loaded" with the activations suitable for identifying features (i.e. the "feature map") in identifying the coordinate transformation.

Figure 2:
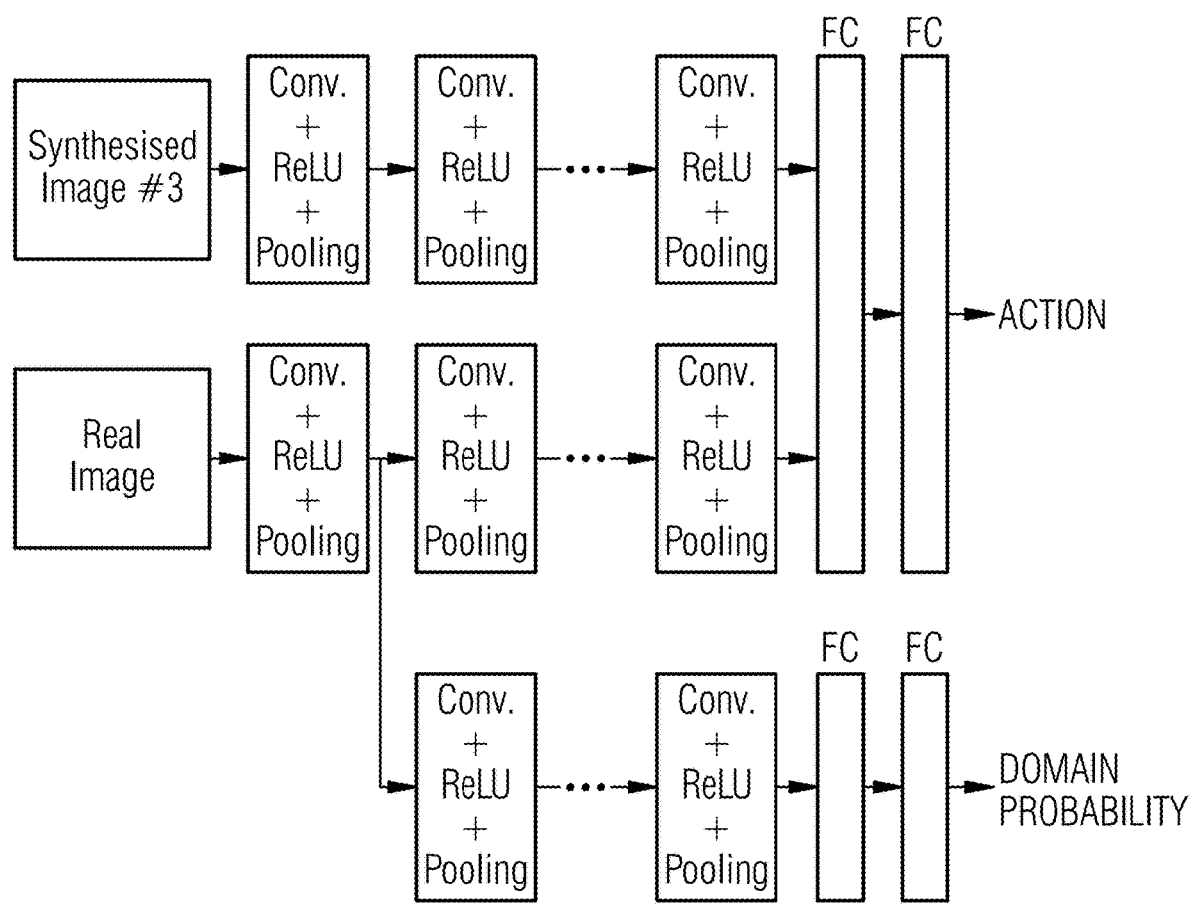
FIG. 2 shows a schematic diagram of a neural network according to an embodiment of the invention in a second training operation or in use subsequent to the second training operation.

The computer system is arranged to implement a second training operation after completion of the first training operation. The second training operation is performed using entirely unlabeled image data. This second training process is illustrated in FIG. 2.

In particular, the second CNN is arranged to receive third image data (image #3) representing a synthesized structure presented in a first of a plurality of different views synthesized according to a model of the structure. This data is un-labeled data. A fourth image data ("real image") is input to the second CNN.

The fourth image data represents a view of an imaged structure generated by capturing an image of the subject. The image data is unlabeled data.

The first hidden layer of the domain classifier of the domain-adversarial network includes a feature map generated by the learning agent during the first training operation. The computer system is configured to generate a probability estimate that the image data input to the second CNN is within the domain of "real" image data, as opposed to "synthesized" image data.

This second training step is conducted subject to the constraint of also determining a coordinate transformation between image #3 and the "real image," using un-labeled data. Thus the second training operation using the unlabeled image data, requires training the computer system to determine a transformation between respective coordinate frames of the view of the "real image" and the view of the synthesized image #3. Training continues until the probability estimate generated by the domain classifier achieves a value of between 0.6 and 0.4. This condition is deemed to indicate, for sufficient practical purposes, to have reduce the ability of the domain classifier to discriminate between the synthesized structure and the imaged structure.

When the second training operation is completed, and the computer system is deemed "trained," one may subsequently use un-labeled images as input to both the first and the second CNN in order to identify a coordinate transformation between them. The effect of the training is to "learn" the more effective feature maps which are better suited to identifying features of actual structures (whether synthetic or "real") rather than feature that merely identify an image as being "synthetic" or "real."

Figure 7:
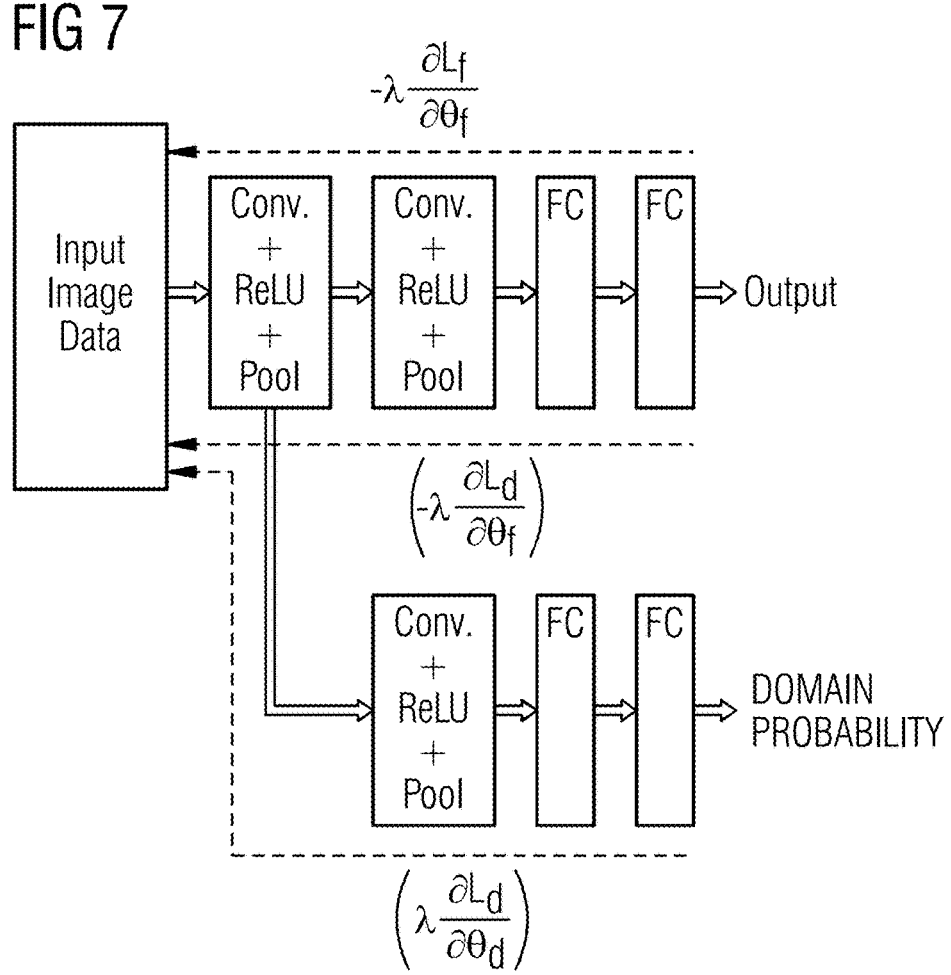
FIG. 7 shows a schematic diagram of a domain adversarial neural network (DANN) relevant to embodiments of the invention.

FIG. 7 schematically illustrates the process of optimization and adversarial updating of the second CNN and the domain classifier of the DANN of FIGS. 1 and 2. The goal of the DANN is to embed adaptation into the process of training/learning transformations of images, so that final classification decisions are made based on features that are both discriminative and invariant to the change of domains (e.g. the synthesized image domain vs. the "real" image domain). The features upon which the learning agent learns to make classification decisions are those having the same or similar statistical distributions in both of the two sources of image data being used at a given training operation (e.g. the second training operation using the second and third image source data).

The goal can be considered as training the learning agent to use image features for determining image transformations that are features from which the agent cannot identify the domain from which the image originated.

FIG. 7 schematically shows the mathematical process for training the learning agent in this way, so that it achieves the combination of being discriminative and having domain-invariance (or being "domain-agnostic"). The domain classifier has the job of discriminating between domains during training. The parameters of the feature maps generated during this process are optimized in order to minimize the loss of the third neural network (i.e. as quantified via a loss of function) which identifies an image transformation, while simultaneously to maximize the loss of the domain classifier. In this way, the domain classifier works in an adverse manner to the third neural network. It encourages domain-invariant features to emerge in the course of optimization whilst performing the first and/or second training operations.

FIG. 7 shows the domain-adversarial neural network connected to the second convolutional neural network as shown in the schematic of the full learning agent illustrated in FIG. 1 and FIG. 2. A bifurcation is used from a selected level of abstraction (feature map) of the second convolutional neural network. The cross-entropy loss of the domain classifier ($L_D(\theta_D)$) is calculated, where $\theta_D$ represents the parameters of the domain classifier. The weights of the whole network are optimised using gradient back-propagation during an iterative training process that comprises the following three successive update rules:

Optimization of the image transformation classifier (the second CNN) with a learning rate $\lambda_f$:

$$\theta_f \leftarrow \theta_f - \lambda_f \frac{\partial L_f}{\partial \theta_f}$$

Optimization of the domain classifier with learning rate $\lambda_D$:

$$\theta_D \leftarrow \theta_D - \lambda_D \frac{\partial L_D}{\partial \theta_D}$$

Adversarial update of the image transformation classifier:

$$\theta_f \leftarrow \theta_f + \alpha \lambda_f \frac{\partial L_D}{\partial \theta_f}$$

The variable $\theta_f$ represents the parameters of the image transformation classifier CNN, which is arranged to minimize the cross-entropy loss ($L_f(\theta_f)$). The first update rule (1) for this network works in an adverse manner with the third update rule (3). The first update rule updates the same parameters $\theta_f$, for image transformation classification, by minimizing $L_f(\theta_f)$. However, the third update rule updates the same parameters to prevent the domain of origin from being recovered from the land features of images used in identifying image transformations, by maximizing $L_D(\theta_D)$. The parameter $\alpha$ is a real-valued number of value between zero (0) and one (1). It controls the "strength" of the adversarial component.

Figure 8:
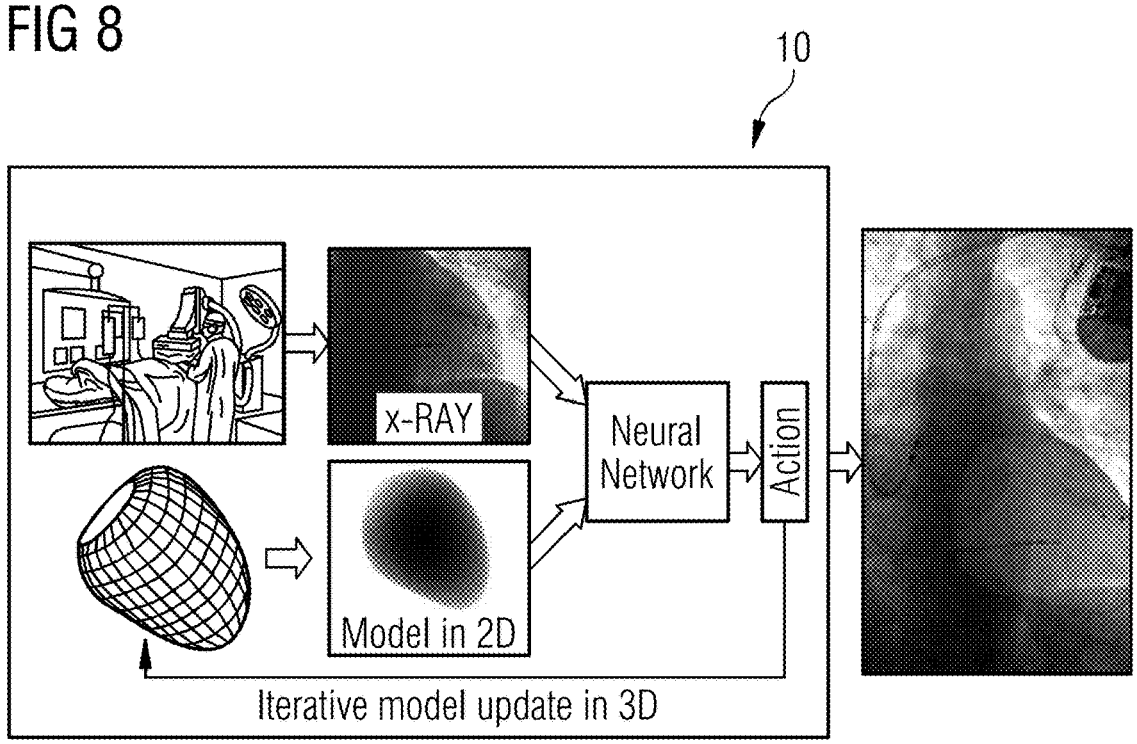
FIG. 8 shows a schematic diagram of a trained learning agent running on a C-arm X-ray system.

FIG. 8 schematically illustrates a medical imaging device comprising a trained learning agent that has been trained according to the methods described above. The imaging apparatus includes a C-arm X-ray image capture and display system (10). A C-arm X-ray image system is a medical imaging device that is based on X-ray technology. The name is derived from the C-shaped arm used to connect an X-ray source and X-ray detector to one another. The C-shaped connecting element allows movement horizontally, vertically and around swivel axes, so that X-ray images of a patient can be produced from many angles. The C-arm comprises an X-ray source and a flat-panel detector. The X-ray source emits X-rays that penetrate the patient's body. The intensity of the incoming X-rays is converted directly into a digital value. The flat-panel detector converts the X-rays into a visible image that is displayed on a display screen of the device. The user can identify and check anatomical details on the image such as organs, bones, etc., and the position of implants and instruments.

The C-arm X-ray image capture and display system (10) includes a computer system (not shown) arranged to generate a three-dimensional model of anatomical parts such as organs, bones, etc., and to generate three-dimensional synthetic image data for those parts. The computer system is arranged to generate projection image data based on a plurality of two-dimensional (2D) projections of the 3D model of a given anatomical part. The computer system determines a spatial/coordinate transformation to be applied to the 2D projection image as necessary to achieve a registration between the synthesized anatomical image and the real X-ray image of the anatomical object.

This is done by calculating a reward for each of a plurality of actions applicable to the projection 2D image data relative to the real X-ray image data. The computer system selects an action based on the determined rewards, and then transforms the projection 2D image data according to the selected action. The step of transforming the projection image data comprises applying the selected action to the 3D model to generate a transformed model. The computer system then generates further projection image data based on a two-dimensional projection of that transformed 3D model. By applying these steps, the computer system of the C-arm X-ray image capture and display system (10) is able to implement the training operation described above.

The display system (10) of the C-arm X-ray image capture system is further arranged to subsequently display real X-ray images of the anatomical object together with the optimally registered 2D projection image (synthesized) of that anatomical object, as schematically shown in FIG. 8. This permits users to accurately represent and locate anatomical objects within X-ray images in real-time.

At least some of the example embodiments described herein may be constructed, partially or wholly, using dedicated special-purpose hardware. Terms such as "component", "module" or "unit" used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination.

In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

Although modifications and changes may be suggested by those skilled in the art, it is the intention of the Applicant to embody within the patent warranted hereon all changes and modifications as reasonably and properly come within the scope of the Applicant's contribution to the art.

The invention claimed is:

1. A method of training a computer system for use in determining a transformation between coordinate frames of image data representing an imaged subject, the method comprising:

receiving first source image data representing a synthesized structure presented in a plurality of different views synthesized according to a model of the structure;

receiving second source image data representing a synthesized structure presented in a plurality of different views synthesized according to a model of the structure;

receiving third source image data representing a view of an imaged structure generated by an imaging apparatus in capturing an image of the subject;

in a first training operation, training a computer system, configured as a learning agent according to a machine learning algorithm, to determine a transformation between respective coordinate frames of at least two of said plurality of different views of the synthesized structure, using the labeled first source image data and labels associated therewith;

wherein the learning agent includes a domain classifier comprising a feature map generated by the learning agent during said first training operation and configured to generate therefrom a classification output indicating that received image data is one of said third source image data or said second source image data; and in a second training operation, using the unlabeled second and third source image data without using labels associated therewith, training a computer system to determine a transformation between respective coordinate frames of said view of the imaged structure and said view of the synthesized structure, such that the ability of the domain classifier to discriminate between said synthesized structure and said imaged structure is reduced.

2. A method of training a computer system according to claim 1 in which the machine learning algorithm comprises one or more neural networks.

3. A method of training a computer system according to claim 1 in which the machine learning algorithm comprises:

a first neural network arranged for receiving input image data, and generating a first network output therefrom;

a second neural network arranged for receiving input image data, and generating a second network output therefrom;

a third neural network arranged for receiving as input both said first network output and said second network output, and generating a third network output therefrom for determining said transformation; and a fourth neural network defining said domain classifier and arranged for receiving as input one or more of the activations generated by a layer of the first neural network and/or the second neural network.

4. A method of training a computer system according to claim 1 in which the first, second and fourth neural networks are each convolutional neutral networks (CNN), and the third neural network is a fully-connected neural network (FC).

5. A method of training a computer system according to claim 1 in which the machine learning algorithm comprises a domain-adversarial neural network.

6. A method of training a computer system according to claim 1 wherein said classification output is a probability estimate and said second training operation comprises training said computer system to determine said transformation such that said probability estimate approaches a value of 0.5 thereby reducing the ability of the domain classifier to discriminate between said synthesized structure and said imaged structure.

7. A method of training a computer system according to claim 6 in which said second training operation comprises training said computer system such that said probability estimate achieves a value of between 0.6 and 0.4.

8. A method of training a computer system according to claim 1 wherein said model is a three-dimensional model comprising three-dimensional image data, and the first target image data comprises two-dimensional image data representing a two-dimensional projection of the three-dimensional model to define a said view.

9. A method of training a computer system according to claim 1, wherein said model is a three-dimensional model comprising three-dimensional image data, said first training operation comprising:
generating projection image data based on a two-dimensional projection of the model;
receiving, at the computer system, the projection image data as said first source image data;
determining, by the computer system, a reward for each of a plurality of actions applicable to the projection image data;
selecting an action based on the determined rewards; and
transforming the projection image data according to the selected action.

10. A method of training a computer system according to claim 9, wherein said transforming the projection image data comprises:
applying the selected action to said model to generate a transformed model; and
generating further projection image data based on a two-dimensional projection of said transformed model.

11. A method of training a computer system according to claim 9, wherein the reward for each of the plurality of actions is determined based on a spatial transformation of the projection image data.

12. A method of training a computer system according to claim 1, wherein said model is a three-dimensional model comprising three-dimensional image data, said second training operation comprising:
generating projection image data based on a two-dimensional projection of the model;
receiving, at the computer system, the projection image data as said second source image data;
determining, by the computer system, a reward for each of a plurality of actions applicable to the projection image data;
selecting an action based on the determined rewards; and
transforming the projection image data according to the selected action.

13. A method of training a computer system according to claim 12, wherein said transforming the projection image data comprises:
applying the selected action to said model to generate a transformed model; and
generating further projection image data based on a two-dimensional projection of said transformed model.

14. A method of training a computer system according to claim 12, wherein the reward for each of the plurality of actions is determined based on a spatial transformation of the projection image data.

15. A method of training a computer system according to claim 1, wherein the third source image data comprises one of: magnetic resonance image data, computed tomography image data, and ultrasound image data, and X-ray image data.

16. A method of training a computer system according to claim 1, determining a transformation between coordinate frames of image data representing an imaged subject, by:
receiving synthesized image data into the trained computer system, representing a view of a structure synthesized according to a model of the structure;
receiving captured image data into the trained computer system, representing an imaged structure generated by capturing an image of the subject; and
in the trained computer system, determining a transformation between the coordinate frames of said synthesized image data and said captured image data using said trained computer system.

17. A medical imaging device comprising:
a medical data acquisition scanner;
a processor that receives first source image data representing a synthesized structure presented in a plurality of different views synthesized according to a model of the structure;
said processor also receiving second source image data representing a synthesized structure presented in a plurality of different views synthesized according to a model of the structure;
said processor also receiving third source image data representing a view of an imaged structure generated by capturing an image of the subject by operating the scanner;
said processor being configured to perform a first training operation, as a learning agent according to a machine learning algorithm, to determine a transformation between respective coordinate frames of at least two of said plurality of different views of the synthesized structure, using the labeled first source image data and using labels associated therewith;
wherein the learning agent includes a domain classifier comprising a feature map generated by the learning agent during said first training operation and configured to generate therefrom a classification output indicating that received image data is one of said third source image data or said second source image data;
said processor being configured to perform a second training operation using the unlabeled second and third source image data without using labels associated therewith, as a learning agent according to a machine learning algorithm, to determine a transformation between respective coordinate frames of said view of the imaged structure and a said view of the synthesized structure, such that the ability of the domain classifier to discriminate between said synthesized structure and said imaged structure is reduced.

18. A medical imaging device according to claim 17 in which the processor:
receives synthesized image data representing a view of a structure synthesized according to a model of the structure;
receives captured image data representing an imaged structure generated by capturing an image of the subject;
determines a transformation between the coordinate frames of said synthesized image data and said captured image data.

19. A non-transitory, computer-readable data storage medium encoded with programming instructions, said storage medium being loaded into a computer system and said programming instructions causing said computer system to:

receive first source image data representing a synthesized structure presented in a plurality of different views synthesized according to a model of the structure;

receive second source image data representing a synthesized structure presented in a plurality of different views synthesized according to a model of the structure;

receive third source image data representing a view of an imaged structure generated by an imaging apparatus in capturing an image of the subject;

in a first training operation, train a computer system, configured as a learning agent according to a machine learning algorithm, to determine a transformation between respective coordinate frames of at least two of said plurality of different views of the synthesized structure, using the labeled first source image data and labels associated therewith;

wherein the learning agent includes a domain classifier comprising a feature map generated by the learning agent during said first training operation and configured to generate therefrom a classification output indicating that received image data is one of said third source image data or said second source image data; and in a second training operation, use the unlabeled second and third source image data without using labels associated therewith, training a computer system to determine a transformation between respective coordinate frames of said view of the imaged structure and said view of the synthesized structure, such that the ability of the domain classifier to discriminate between said synthesized structure and said imaged structure is reduced.

* * * * *